Patented May 28, 1935

2,002,859

UNITED STATES PATENT OFFICE 2,002,859

PRODUCTION OF FERRIC COMPOUNDS

Stanley Isaac Levy, Surrey, and George Wynter Gray, London, England

No Drawing. Application December 10, 1930, Serial No. 501,464. In Great Britain January 31, 1930

8 Claims. (Cl. 23—126)

It is known that chlorine may be obtained from suitable ferric salts by admixing therewith a chloride of an alkali or alkaline earth metal, such as sodium, calcium, magnesium or other chloride, and heating the mixture in a current of air or oxygen.

It is necessary that the ferric salt should not be fusible or volatile at the temperature required for the reaction, namely 300°–600° C. Ferric sulphate is the most suitable and most easily prepared compound which fulfills these conditions. Reaction occurs according to the equation:

(A) $2Fe_2(SO_4)_3 + 12NaCl + 3O_2 =$
$2Fe_2O_3 + 6Na_2SO_4 + 6Cl_2$

It has not hitherto been possible to obtain pure ferric sulphate under industrial conditions. Commercial ferric sulphate is very far from pure; usually it contains moisture and either free sulphuric acid or some basic ferric sulphate. Furthermore the cost of making ferric sulphate by present methods renders its use for production of chlorine uneconomical.

In accordance with our invention, suitable ferric salts of a high degree of purity, and quite free from moisture and acid, are obtained by oxidation in the dry way and at elevated temperatures of a suitable ferrous salt, with simultaneous formation of a second ferric compound volatile at the temperature employed. As ferrous salt we may employ ferrous phosphate, ferrous sulphate, ferrous chloride, or other ferrous compound easily obtainable in the anhydrous technically pure condition. As oxidizing agents we use, with ferrous phosphate or sulphate, chlorine or bromine; with ferrous chloride we use a mixture of equal volumes of sulphur dioxide and oxygen, or a mixture of two volumes of sulphur trioxide with one volume of oxygen. As a source of oxygen we generally prefer to use air.

The formation of ferric salts according to these methods may be expressed by the following equations, in which the heat effects are expressed in kilogram calories (K):—

(B) $6FeSO_4 + 3Cl_2 = 2Fe_2(SO_4)_3 + Fe_2Cl_6 + 146K$
(C) $6FeSO_4 + 3Br_2 = 2Fe_2(SO_4)_3 + Fe_2Br_6 + 134K$
(D) $2Fe_3(PO_4)_2 + 3Cl_2 = 4FePO_4 + Fe_2Cl_6$
(E) $6FeCl_2 + 3SO_2 + 3O_2 =$
$Fe_2(SO_4)_3 + 2Fe_2Cl_6 + 325K$
(F) $6FeCl_2 + 3SO_3 + 3/2O_2 =$
$Fe_2(SO_4)_3 + 2Fe_2Cl_6 + 256K$

It will be seen that the whole of the free halogen used in Equations (B), (C) and (D) is obtained as the volatile ferric halide. Since ferric chloride and bromide are readily and completely oxidized by air or oxygen at 600° C.–1000° C. with formation of ferric oxide and liberation of the free halogen, the latter may be used and recovered again without loss, so that the production of the non-volatile ferric salt does not involve a real consumption of halogen; only that amount required to make up manipulation and other incidental losses is, in fact, consumed. Similarly, the chlorine employed as ferrous chloride in Equations (E) and (F) is converted into ferric chloride and may be recovered as free chlorine by burning the latter in air or oxygen. We may also employ bromide in place of chloride in Equations (E) and (F).

The preferred forms of our invention are those expressed by Equations (B) and (E). Owing to the high cost of bromine, Reaction (C) is less advantageous, small incidental losses of halogen involving disproportionate expense. The reaction expressed by Equation (F) does not proceed quite smoothly, and the results are not quantitative. Reactions (B) and (E) on the other hand, proceed very smoothly, and give very high yields of unusually pure products; the materials required are cheap and easily prepared.

Reaction (B) proceeds best at a temperature of 350°–400° C. It is necessary to secure constant renewal of the surfaces of the solid exposed to the gas. For this reason we prefer a mechanically operated furnace in which the material is constantly raked over or rabbled; a rotating cylinder filled with balls or rounded pieces of inert material is also suitable. We have obtained excellent results with a stationary furnace, the solid material being discharged, when the reaction slows down, crushed, and again exposed to the gas. As the heat of reaction is not very great, it is desirable to start with preheated materials.

If the ferrous sulphate is prepared by driving off the water from the ordinary crystalline form, it is easy to employ the anhydrous product already hot from the drier.

Reaction (E) proceeds smoothly and quantitatively at 350° C.; at temperatures above 400° C. part of the charge is liable to melt, and render reaction incomplete. At 350° C. the reaction is quantitative even in a stationary furnace. In this form of our invention it is convenient to use hot gases directly from pyrites or sulphur burners, the composition of which may be suitably adjusted by controlling the admission of air to the burner; ordinary iron apparatus and furnaces may be used without fear of corrosion.

The anhydrous ferric sulphate obtained by either of these forms of our invention is mixed in the necessary proportion with dried common salt, or other suitable chloride, and heated in a current of oxygen or air. Reaction begins at about 400° C. and proceeds readily; when the evolution of chlorine slackens, the temperature may be raised slowly to 600° C. Too high a temperature in the early stages of the reaction should be avoided, owing to the possibility of fusion; the ferric oxide formed in the course of the reaction suffices to prevent fusion when the temperature is raised towards the end. The reaction (Equation (A)) is slightly endothermic, and it is convenient to use air preheated to a temperature of 500-600° C.; the regulation of temperature required is easily secured by passing the heated air in counter-current to the solid moving continuously through the furnace, which may be of the rabble or rotating cylindrical type.

Whilst we prefer to carry out our invention to produce ferric chloride as the volatile salt, and ferric sulphate as the non-volatile ferric salt to be used in the step of preparing free chlorine we do not restrict ourselves to these only, but may employ it to produce any other ferric compounds.

We may also use the ferric compounds so obtained to prepare free bromine for example by substituting sodium bromide for the sodium chloride used in Equation (A).

We claim:

1. A process of preparing simultaneously two different ferric salts, one of which is volatile and the other non-volatile at the temperature of preparation, consisting in subjecting ferrous chloride to the action of gases containing equal volumes of sulphur dioxide and oxygen.

2. A process of preparing simultaneously two different ferric salts, one of which is volatile and the other non-volatile at the temperature of preparation, consisting in subjecting ferrous chloride to the action of gases containing equal volumes of sulphur dioxide and oxygen at a temperature in the region of 350° C.

3. A process of preparing simultaneously in the dry way ferric salts of two different acids, one being a ferric halide, which comprises subjecting a ferrous salt of one acid to the action of a gaseous medium capable of reacting with the ferrous salt to form a ferric halide and a ferric salt containing another acid radical, the temperature of said reaction being sufficiently high to cause volatilization of the ferric halide.

4. A process of preparing simultaneoulsy in the dry way ferric salts of two different acids, one being a ferric halide, which comprises subjecting ferrous sulfate to the action of a gaseous halide, the temperature of said reaction being sufficiently high to cause volatilization of the ferric halide resulting from the reaction.

5. A process of preparing simultaneously in the dry way ferric sulfate and ferric chloride, which comprises subjecting ferrous sulfate to the action of gaseous chlorine, the temperature of said reaction being sufficiently high to cause volatilization of the ferric chloride resulting from the reaction.

6. A process of preparing simultaneously in the dry way two different ferric salts, one being ferric chloride, which comprises subjecting ferrous sulfate to the action of gases containing free chlorine, the temperature of said reaction being sufficiently high to cause volatilization of the ferric chloride resulting from the reaction.

7. A process of preparing simultaneously in the dry way two different ferric salts, one being ferric chloride, which comprises subjecting ferrous sulfate to the action of chlorine at a temperature of 350-400° C.

8. A process of preparing simultaneously in the dry way two different ferric salts, one being ferric chloride, which comprises subjecting ferrous sulfate to the action of gases containing free chlorine at a temperature of 350-400° C.

STANLEY ISAAC LEVY.
GEORGE WYNTER GRAY.